US008231747B2

(12) United States Patent
Mendenhall et al.

(10) Patent No.: US 8,231,747 B2
(45) Date of Patent: Jul. 31, 2012

(54) INFLATOR ASSEMBLY

(75) Inventors: Ivan V. Mendenhall, Providence, UT (US); Gary K. Lund, Malad City, ID (US)

(73) Assignee: Autoliv ASP, Inc., Ogden, UT (US)

( * ) Notice: Subject to any disclaimer, the term of this patent is extended or adjusted under 35 U.S.C. 154(b) by 318 days.

(21) Appl. No.: 12/511,554

(22) Filed: Jul. 29, 2009

(65) Prior Publication Data

US 2011/0025029 A1 Feb. 3, 2011

(51) Int. Cl.

| | |
|---|---|
| ***C06B 31/28*** | (2006.01) |
| ***C06B 25/00*** | (2006.01) |
| ***C06B 25/34*** | (2006.01) |
| ***D03D 23/00*** | (2006.01) |
| ***D03D 43/00*** | (2006.01) |

(52) U.S. Cl. ........... 149/109.2; 149/46; 149/88; 149/92; 149/109.4

(58) Field of Classification Search .................... 149/27, 149/46, 88, 92, 109.2, 109.4
See application file for complete search history.

(56) References Cited

U.S. PATENT DOCUMENTS

| | | | | |
|---|---|---|---|---|
| 3,862,866 A | 1/1975 | Timmerman et al. | |
| 5,817,972 A * | 10/1998 | Butt et al. | 149/109.2 |
| 6,143,104 A * | 11/2000 | Blomquist | 149/61 |
| 6,231,702 B1 * | 5/2001 | Blomquist | 149/36 |
| 6,241,281 B1 | 6/2001 | Hinshaw et al. | |
| 6,361,630 B2 * | 3/2002 | Helmy et al. | 149/19.4 |
| 6,550,808 B1 | 4/2003 | Mendenhall | |
| 6,589,375 B2 * | 7/2003 | Knowlton et al. | 149/45 |
| 6,605,233 B2 * | 8/2003 | Knowlton et al. | 252/181.1 |
| 6,875,295 B2 * | 4/2005 | Blomquist et al. | 149/19.7 |
| 2002/0148543 A1 | 10/2002 | Rink et al. | |
| 2003/0042718 A1 | 3/2003 | Katsuda et al. | |
| 2003/0094225 A1 | 5/2003 | Knowlton et al. | |
| 2006/0054257 A1 | 3/2006 | Mendenhall et al. | |

* cited by examiner

*Primary Examiner* — James McDonough
(74) *Attorney, Agent, or Firm* — Sally J. Brown; Pauley Petersen & Erickson

(57) ABSTRACT

An inflator assembly having an inflator body that forms a chamber wherein a quantity of a gas generating solid reacts to form gas. A quantity of gas treatment material is included to treat the formed gas to form a treated gas. At least one assembly exit opening permits the treated gas to exit the inflator assembly. The required gas generating solid has a flame temperature of no more than 1670 K with the inflator assembly having significant weight and volume reductions as compared to an otherwise identical performing inflator assembly that utilizes gas generating composition having higher flame temperatures.

26 Claims, 1 Drawing Sheet

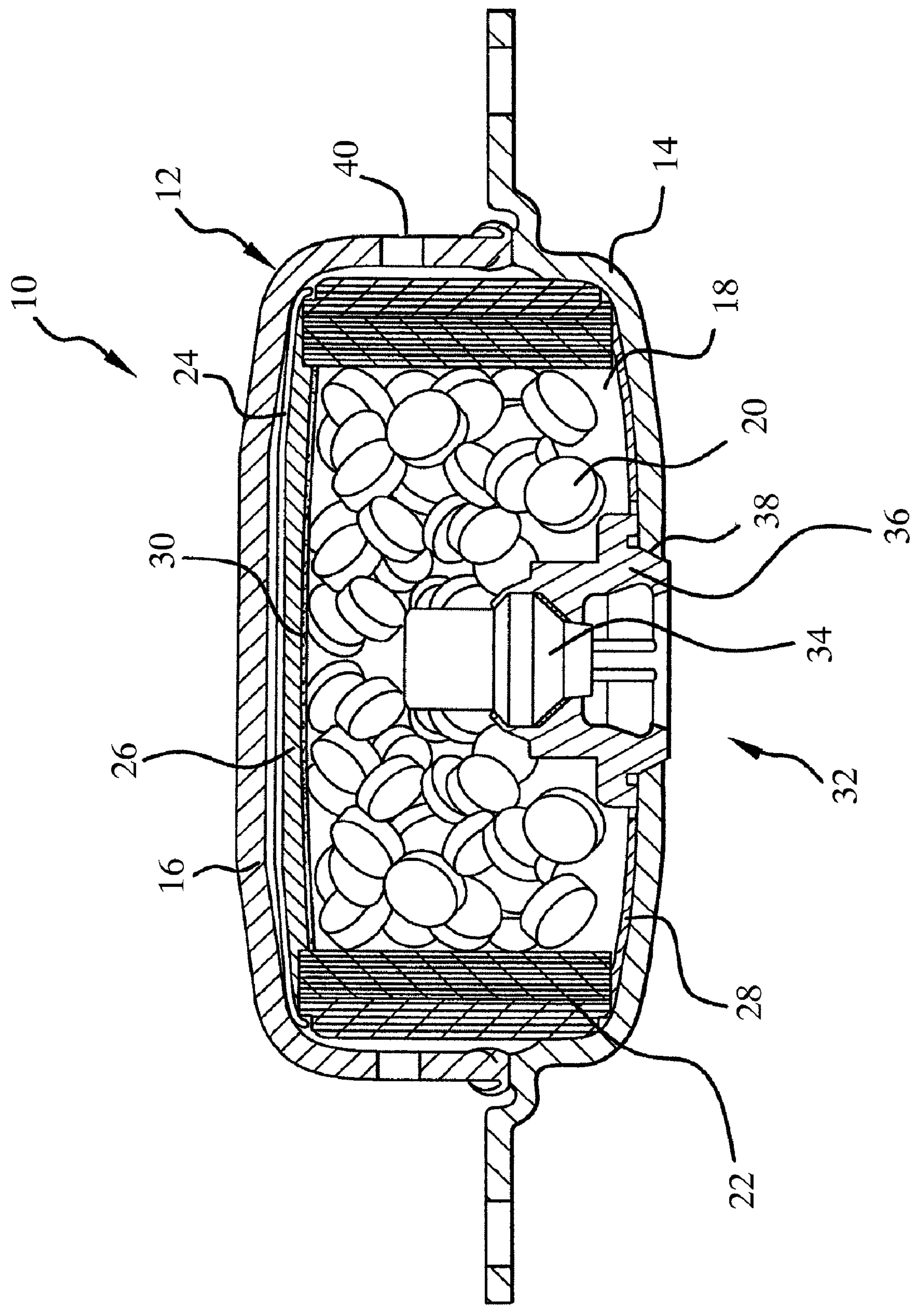
10
12
40
14
18
24
20
38
36
30
34
26
32
16
28
22

INFLATOR ASSEMBLY

BACKGROUND OF THE INVENTION

This invention relates generally to the provision or supply of inflation gas and, more particularly, to an assembly for providing or supplying an inflation gas such as may be desired for certain inflatable passive restraint systems for use in vehicles for restraining the movement of an occupant in the event of a vehicular collision.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have been included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion.

Various types or forms of inflator assemblies or devices have been disclosed in the art for use in inflating an airbag cushion such as used in inflatable restraint systems. One type of known inflator device derives inflation gas from a combustible pyrotechnic gas generating material which, upon ignition, generates a quantity of gas sufficient to inflate the airbag.

Gas generating materials used in such inflator assemblies desirably produce or provide sufficient gas mass flow in a desired time interval to achieve the required work impulse. In practice, the temperature of the gas can and does influence the amount of work the generant gases can do. Excessively high gas temperatures are generally sought to be avoided due to possible associated complications such as burns and/or other forms of thermal damage. In addition, applications with high gas temperatures can lead to an excessive reliance and/or sensitivity of the gas to heat transfer and consequently to excessively rapid deflation profiles for associated inflatable restraint devices. To mitigate the effects of high temperature materials, it is common to relegate a significant portion of the mass of an inflator assembly to at least in part to function or serve as a heat sink. Unfortunately, such practice can undesirably impact both the efficiency of the system and the weight of the inflator.

In addition to the above, there is an ongoing challenge to simplify or facilitate manufacture and assembly as well as to reduce the associated costs in the design and development of modern vehicles and the assemblies and components included therewithin, such as inflator assemblies included in vehicle occupant safety restraint systems.

SUMMARY OF THE INVENTION

The present invention provides an improved inflator assembly.

In a first aspect, there is provided an inflator assembly that includes an inflator body forming a chamber wherein a quantity of a gas generating solid reacts to form gas. The assembly also includes a quantity of gas treatment material to treat the formed gas to form a treated gas and at least one assembly exit opening to permit the treated gas to exit the inflator assembly.

The gas generating solid has a flame temperature of no more than 1670 K and includes at least one of an organic fuel, a transition metal salt of an organic fuel and a transition metal nitrate complex of an organic fuel. The organic fuel includes at least the elements carbon, hydrogen and oxygen, and at least one functional group selected from the list of amide, imine, hydroxyl and carboxylic acids. The organic fuel further has an oxygen-to-carbon mole ratio of at least 0.5 and an exothermic heat of formation of no less than −400 KJ/mole. The at least one organic fuel, transition metal salt of an organic fuel and transition metal nitrate complex of an organic fuel is present in a relative amount of between about 5 and about 50 composition weight percent. The gas generating solid also includes:

between about 10 and about 30 composition weight percent co-fuel;

between about 25 and about 70 composition weight percent of basic metal nitrate oxidizer, and between 0 and about 15 composition weight percent metal oxide coolant.

The inflator assembly further has weight and volume reductions at least in the ranges of about 20 to about 40 percent as compared to an otherwise identically performing inflator assembly that utilizes a gas generating composition having a flame temperature of at least 1800 K.

In another particular aspect, there is provided an inflator assembly that includes an inflator body forming a chamber wherein a quantity of a gas generating solid reacts to form gas. The inflator assembly also includes a quantity of gas treatment material to treat the formed gas to form a treated gas and at least one assembly exit opening to permit the treated gas to exit the inflator assembly.

The gas generating solid has a flame temperature of no more than 1670 K and includes at least one of an organic fuel, a transition metal salt of an organic fuel and a transition metal nitrate complex of an organic fuel. The organic fuel includes at least the elements carbon, hydrogen and oxygen and at least one functional group selected from the list of amide, imine, hydroxyl and carboxylic acids. The organic fuel also has an oxygen-to-carbon mole ratio of at least 0.5 and an exothermic heat of formation of no less than −400 KJ/mole. The at least one organic fuel, transition metal salt of an organic fuel and transition metal nitrate complex of an organic fuel is present in a relative amount of between about 10 and about 20 composition weight percent. The gas generating solid also includes:

between about 10 and about 20 composition weight percent guanidine nitrate, between about 25 and about 70 composition weight percent of basic copper nitrate oxidizer and between 0 and about 15 composition weight percent metal oxide coolant.

The inflator assembly further has weight and volume reductions at least in the ranges of about 20 to about 40 percent as compared to an otherwise identical performing inflator assembly that utilizes a gas generating composition having a flame temperature of at least 1800 K.

In yet another aspect, there is provided an inflator assembly of reduced size and weight for inflating an inflatable vehicle occupant safety restraint. One such inflator assembly includes an inflator body forming a chamber wherein a quantity of the gas generating solid reacts to form gas and a quantity of gas treatment material to treat the formed gas to form a treated gas. The inflator assembly further includes at least one assembly exit opening to permit the treated gas to exit the inflator assembly and pass to an associated inflatable vehicle occupant safety restraint. The gas generating solid desirably has a flame temperature of no more than 1670 K and includes at least one of an organic fuel, a transition metal salt of an organic fuel and a transition metal nitrate complex of an organic fuel, wherein the organic fuel includes at least the elements carbon, hydrogen, oxygen and nitrogen, and at least one amide functional group. The organic fuel desirably has an oxygen-to-carbon mole ratio of at least 0.5 and an exothermic heat of formation of no less than −400 KJ/mole. The at least one organic fuel, transition metal salt of an organic fuel and transition metal nitrate complex of an organic fuel is desirably present in a relative amount of between about 5 and about 50 composition weight percent. The gas generating solid also includes:

between about 10 and about 30 composition weight percent guanidine nitrate;

between about 25 and about 70 composition weight percent of basic copper nitrate oxidizer, and between 0 and about 15 composition weight percent metal oxide coolant selected from the group consisting of cupric oxide, iron oxide and zinc oxide.

The inflator assembly further has weight and volume reductions each at least in the range of about 20 to about 40 percent as compared to an otherwise identical performing inflator assembly that utilizes a gas generating composition having a flame temperature of at least 1800 K.

As used herein, references to a specific composition, component or material as a "fuel" are to be understood to refer to a chemical which generally lacks sufficient oxygen to burn completely to $CO_2$, $H_2O$ and $N_2$.

Correspondingly, references herein to a specific composition, component or material as an "oxidizer" are to be understood to refer to a chemical generally having more than sufficient oxygen to burn completely to $CO_2$, $H_2O$ and $N_2$.

References herein to a fuel or oxidizer as "primary" are to be understood to generally refer to the respective fuel or oxidizer that is present in the greatest concentration or relative amount.

Other objects and advantages will be apparent to those skilled in the art from the following detailed description taken in conjunction with the appended claims and drawing.

BRIEF DESCRIPTION OF THE DRAWING

The FIGURE is a simplified, partially in section, schematic drawing of an airbag inflator assembly in accordance with one embodiment of the invention.

DETAILED DESCRIPTION OF THE INVENTION

The FIGURE illustrates an airbag inflator assembly, generally designated with the reference numeral 10, and in accordance with one embodiment of the invention. The airbag inflator assembly 10 has a generally cylindrical external outline and includes a housing 12 such as formed from two structural components, i.e., a lower shell or base portion 14 and an upper shell or diffuser cap portion 16, such as may desirably be appropriately joined or fastened together.

The housing 12 is configured to define a generally cylindrical chamber, here designated by reference numeral 18. The chamber 18 contains or houses a quantity or supply of gas generant material 20, such as composed of a gas generating solid and such as is reactable to form gas, as described in greater detail below.

If desired, a quantity of gas treatment material, such as in the form of a gas filter assembly 22 and such as is effective to treat the formed gas to form a treated gas, surrounds the gas generant material 20. Such gas treatment may involve or include one or more of removal of particulates such as formed during gas generation and such as may be otherwise entrained in the generated gas as well as or alternatively in cooling of the generated gas prior to discharge from the inflator.

The airbag inflator assembly 10 includes a retainer 24, a diffuser damper pad cushion 26 and a base damper pad cushion 28 which serve to prevent undesired rattle or contact of the gas generant material 20 within the airbag inflator assembly 10. If desired, the diffuser damper pad cushion 26 and/or the base damper pad cushion 28 can be treated with an igniter composition such as may serve to facilitate the actuated ignition of the gas generant material 20. For example, damper pad cushion 26 can include an igniter coating 30 such as adhered to at least a portion of a surface of the pad.

The airbag inflator assembly 10 further includes an igniter assembly, generally designated by reference numeral 32 such as in the form of an igniter squib 34 and a squib adapter or holder 36. Suitably, the igniter squib 34 is mounted to or mated with the housing 12 in a location within the chamber 18 via a mounting opening 38.

The airbag inflator assembly 10 also includes one or more assembly exit openings 40 such as may serve to permit the treated gas to exit the inflator assembly.

When actuated, the squib 34 causes ignition and reaction of the gas generant material 20. For example, the squib can cause ignition of the igniter coating 30 of the diffuser damper pad cushion 26. The products formed or resulting from such ignition are, through the designed configuration, in direct contact with the gas generant material 20 contained within the chamber 18 such as to result in the ignition and reaction of the gas generant material 20. The gases produced or formed by such reaction then pass through the gas filter assembly 22, if included, and out of the airbag inflator assembly 10 into an associated airbag cushion (not shown).

As identified above, the airbag inflator assembly 10 includes a quantity or supply of gas generant material 20, such as composed of a gas generating solid and such as is reactable to form gas. As detailed below, the required gas generating solid desirably has a flame temperature of no more than 1670 K and can desirably result in the inflator assembly having significant weight and volume reductions as compared to otherwise identical performing inflator assemblies that utilizes gas generating composition having higher flame temperatures.

More particularly, it has been unexpectedly discovered that suitable gas generating solids include a component, sometimes referred to herein as the "cool-burning fuel" component, such as preferably composed of one or more of an organic fuel, a transition metal salt of an organic fuel and/or a transition metal nitrate complex of an organic fuel wherein the organic fuel includes at least the elements carbon, hydrogen and oxygen, includes at least one functional group selected from the list of amide, imine, hydroxyl and carboxylic acids and has an oxygen-to-carbon mole ratio of at least 0.5 and an exothermic heat of formation of no less than −400 KJ/mole. In certain particular embodiments, the organic fuel also includes the element nitrogen. In practice, the organic fuel is desirably free of nitro and cyano functional groups.

Suitable organic fuel materials can include amides, including cyclic amides. Specifically preferred such fuel materials include barbituric acid, cyanuric acid, oxamide, biuret, hydantoin, allantoin, malonamide, succinamide, parabanic acid, diglycine, and imidurea. Other suitable organic fuel materials can include hydroxy-containing compounds. Specifically preferred such fuel materials include phloroglucinol, mannitol, maltitol and sorbitol. Still other suitable organic fuel materials can include carboxylic acids. Specifically preferred such fuel materials include glycine, malonic acid and succinic acid. In certain embodiments, the organic fuel is one of an amine, guanidinium and guanylurea salt of an acidic organic fuel.

The amount of cool-burning fuel component in the gas generating material solid can vary depending upon various factors such as the particular fuel material involved and other reactants. In one preferred embodiment, the gas generating material solids desirably includes or contains such cool-burning fuel component in a relative amount of at least about 5 and up to about 50 composition weight percent. In certain preferred embodiments, the cool-burning fuel component is desirably present in a relative amount of at least about 10 composition weight percent, with certain preferred embodiments having a maximum cool-burning fuel component content of no more than about 20 composition weight percent.

Gas generating solids for use in the practice of the invention desirably contain or include a co-fuel, such as may be desired to increase the gas yield and/or facilitate processing, for example. One such preferred co-fuel is guanidine nitrate. The amount of co-fuel in the gas generating material solid can vary depending upon factors such as the particular co-fuel material involved and other reactants. In certain embodiments, the gas generating material solids desirably includes or contains such co-fuel component in a relative amount of at least about 10 and up to about 30 composition weight percent. In certain preferred embodiments, the co-fuel component is desirably present in a relative amount of at least about 15 composition weight percent, with certain preferred embodiments having a maximum co-fuel component content of no more than about 20 composition weight percent.

Gas generating solids for use in the practice of the invention desirably contain or include a basic metal nitrate oxidizer component such preferably composed of basic copper nitrate. In one preferred embodiment, the gas generating material solids desirably includes or contains such basic metal nitrate oxidizer component in a relative amount of at least about 25 and up to about 70 composition weight percent. In certain preferred embodiments, the basic metal nitrate oxidizer component is desirably present in a relative amount of at least about 30 composition weight percent, with certain preferred embodiments having a maximum basic metal nitrate oxidizer component content of no more than about 65 composition weight percent.

Gas generating solids for use in the practice of the invention may also desirably contain or include one or more metal oxide coolant such as selected from the group consisting of cupric oxide, iron oxide and zinc oxide. If included, such metal oxide coolant is desirably included in a relative amount of up to about 15 composition weight percent.

Suitable gas generating solids, if desired, may also include one or more ingredients such as known in the art as slagging agents and/or manufacturing aids. In such applications and uses these ingredients desirably avoid reaction and as such are effectively classified as inert materials or ingredients. Examples of possibly suitable such materials, dependent on the specifics conditions and requirements of a particular application can include silicon dioxide, E-glass fibers, aluminum oxide, titanium dioxide and the like.

As will be appreciated by those skilled in the art and guided by the teachings herein provided, embodiments such as described above can desirably reduce, minimize and in some cases eliminate required generated gas treatment cooling prior to the generated gas exiting from the inflator device. In view thereof, resulting inflator assemblies can desirably have weight and volume reductions each in the range of at least about 20 to about 40 percent as compared to an otherwise identical performing inflator assembly that utilizes a gas generating composition having a flame temperature of at least 1800 K. In particular embodiments, the resulting inflator assembly can desirably be fabricated to have a chamber wall thickness of at least about 10 to about 20 percent less than an otherwise identical performing inflator assembly that utilizes a gas generating composition having a flame temperature of at least 1800 K.

While the invention has been described above making specific reference to an embodiment wherein at least a portion of the gas treatment material is disposed within the chamber wherein a quantity of the gas generating solid reacts to form gas, those skilled in the art and guided by the teachings herein provided will appreciate that the broader practice of the invention is not necessarily so limited. In particular, the gas treatment material may be included or contained within a particular inflator assembly in a portion or chamber of the inflator assembly other than the chamber in which the gas generating solid reacts to form gas. For example, the gas treatment material may be included or contained within an inflator assembly in a portion or chamber exterior to the primary reaction chamber such as in the form of a filtration or cooling chamber or a diffuser chamber.

The present invention is described in further detail in connection with the following examples which illustrate or simulate various aspects such as may be involved in the practice of the invention. It is to be understood that all changes that come within the spirit of the invention are desired to be protected and thus the invention is not to be construed as limited by these examples.

EXAMPLES

Gas generating solids in accordance with the invention and as shown in TABLE 1, below, where values are in terms of composition weight percent, were prepared in laboratory mixtures. In each case, a twenty gram quantity of the respective gas generant material was prepared by dissolving the guanidine nitrate in 9 grams of water at 70° C. and then stirring in the other listed ingredients. The resulting mixture was dried at 80° C. and then granulated through a 40 mesh screen.

TABLE 1

| INGREDIENT | EX 1 | EX 2 | EX 3 | EX 4 | EX 5 |
|---|---|---|---|---|---|
| basic copper nitrate | 60.43 | 28.61 | 54.20 | 67.56 | 51.91 |
| guanidine nitrate | 19.57 | 15.00 | 25.80 | 14.44 | 25.09 |

TABLE 1-continued

| INGREDIENT | EX 1 | EX 2 | EX 3 | EX 4 | EX 5 |
|---|---|---|---|---|---|
| cool burning fuel | allantoin | copper bis biuret dinitrate | cyanuric acid | malonamide | oxamic acid |
| | 17.00 | 41.39 | 17.00 | 15.00 | 20.00 |
| $SiO_2$ | 3.00 | 3.00 | 3.00 | 3.00 | 3.00 |
| metal oxide | 0.00 | 12.00 ($Fe_2O_3$) | 0.00 | 0.00 | 0.00 |

For each of these gas generating solids, the flame temperature ($T_c$), gas yield (Gn), density, and, for the cool burning fuel component, the heat of formation (ΔH) and oxygen-to-carbon mole ratio (O/C) were determined/analyzed and are shown in the TABLE 2, below, with the gas yield for each of these gas generant compositions calculated in each case using the commercially available software program "PEP" (Propulsion Evaluation Program), compiled by Martin Marietta.

TABLE 2

| | EX 1 | EX 2 | EX 3 | EX 4 | EX 5 |
|---|---|---|---|---|---|
| $T_C$ (K) | 1552 | 1536 | 1549 | 1523 | 1521 |
| Gn (moles/100 g) | 2.38 | 2.34 | 2.51 | 2.30 | 2.56 |
| Density (g/cc) | 2.32 | 2.28 | 2.21 | 2.37 | 2.14 |
| ΔH (KJ/mole) | −718 | −1482 | −704 | −543 | −661 |
| O/C mole ratio | 0.75 | 2.50 | 1.0 | 0.67 | 1.50 |

Thus, there are provided gas generating solid-containing inflator assemblies that desirably achieve a high gas output at a high mass flow rate and at a relatively low flame temperature. For example, such inflators may incorporate reduced filtration or cooling of generated gases such as may serve to improve the efficiency of the associated restraint system installations and can significantly reduce the size, weight and/or cost of the inflator component of such installations.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator assembly comprising:

an inflator body forming a chamber wherein a quantity of a gas generating solid reacts to form gas, a quantity of gas treatment material to treat the formed gas to form a treated gas and at least one assembly exit opening to permit the treated gas to exit the inflator assembly, wherein the gas generating solid has a flame temperature of no more than 1670 K and comprises:

at least one of an organic fuel, a transition metal salt of said organic fuel and a transition metal nitrate complex of said organic fuel, wherein said organic fuel comprises at least the elements carbon, hydrogen and oxygen, includes at least one functional group selected from the list of amide, imine, hydroxyl and carboxylic acids and has an oxygen-to-carbon mole ratio of at least 0.5 and an exothermic heat of formation of no less than −400 KJ/mole; the at least one organic fuel, transition metal salt of said organic fuel and transition metal nitrate complex of said organic fuel present in a relative amount of between about 5 and about 50 composition weight percent;

between about 10 and about 30 composition weight percent co-fuel;

between about 25 and about 70 composition weight percent of basic metal nitrate oxidizer, and between 0 and about 15 composition weight percent metal oxide coolant, wherein the organic fuel is free of nitro and cyano functional groups.

2. The inflator assembly of claim 1 wherein the at least one of an organic fuel, a transition metal salt of said organic fuel and a transition metal nitrate complex of said organic fuel is present in a relative amount of between about 10 and about 20 composition weight percent.

3. The inflator assembly of claim 1 wherein the gas generating solid contains between about 15 and about 20 weight percent guanidine nitrate.

4. The inflator assembly of claim 1 wherein the gas generating solid contains basic copper nitrate.

5. The inflator assembly of claim 1 wherein the basic metal nitrate oxidizer is basic copper nitrate and said basic copper nitrate is present in a relative amount of between about 30 and about 65 composition weight percent.

6. The inflator assembly of claim 1 wherein the gas generating solid comprises at least one metal oxide selected from the group consisting of cupric oxide, iron oxide and zinc oxide.

7. The inflator assembly of claim 1 wherein the organic fuel additionally comprises the element nitrogen.

8. The inflator assembly of claim 1 wherein the organic fuel is one of an amine, guanidinium and guanylurea salt of an acidic organic fuel.

9. The inflator assembly of claim 1 wherein the organic fuel is an amide selected from the group consisting of:

barbituric acid, cyanuric acid, oxamide, biuret, hydantoin, allantoin, malonamide, succinamide, parabanic acid, diglycine, and imidurea.

10. The inflator assembly of claim 1 wherein the organic fuel is a hydroxy-containing compound selected from the group consisting of:

phloroglucinol, mannitol, maltitol and sorbitol.

11. The inflator assembly of claim 1 wherein the organic fuel is a carboxylic acid selected from the group consisting of:

glycine, malonic acid and succinic acid.

12. The inflator assembly of claim 1 wherein at least a portion of the quantity of gas treatment material is disposed within the chamber wherein a quantity of the gas generating solid reacts to form gas.

13. An inflator assembly of reduced size and weight for inflating an inflatable vehicle occupant safety restraint, the inflator assembly comprising:

an inflator body forming a chamber wherein a quantity of the gas generating solid reacts to form gas, a quantity of gas treatment material to treat the formed gas to form a treated gas and at least one assembly exit opening to permit the treated gas to exit the inflator assembly and pass to an associated inflatable vehicle occupant safety restraint, wherein the gas generating solid has a flame temperature of no more than 1670 K and comprises:

at least one of an organic fuel, a transition metal salt of said organic fuel and a transition metal nitrate complex of said organic fuel, wherein said organic fuel comprises at least the elements carbon, hydrogen, oxygen and nitrogen, includes at least one amide functional group and has an oxygen-to-carbon mole ratio of at least 0.5 and an exothermic heat of formation of no less than −400 KJ/mole; the at least one organic fuel, transition metal salt of said organic fuel and transition metal nitrate complex of said organic fuel present in a relative amount of between about 5 and about 50 composition weight percent;

between about 10 and about 30 composition weight percent guanidine nitrate;

between about 25 and about 70 composition weight percent of basic copper nitrate oxidizer, and between 0 and about 15 composition weight percent metal oxide coolant selected from the group consisting of cupric oxide, iron oxide and zinc oxide, wherein the organic fuel is free of nitro and cyano functional groups.

14. The inflator assembly of claim 13 wherein:

the at least one organic fuel, transition metal salt of said organic fuel and transition metal nitrate complex of said organic fuel is present in a relative amount of between about 10 and about 20 composition weight percent;

the guanidine nitrate is present in a relative amount of between about 15 and about 20 composition weight percent guanidine nitrate; and the basic copper nitrate oxidizer is present in a relative amount of between about 30 and about 65 composition weight percent.

15. The inflator assembly of claim 13 wherein:

the organic fuel is an amide selected from the group consisting of:

barbituric acid, cyanuric acid, oxamide, biuret, hydantoin, allantoin, malonamide, succinamide, parabanic acid, diglycine, and imidurea.

16. The inflator assembly of claim 13 wherein at least a portion of the quantity of gas treatment material is disposed within the chamber wherein a quantity of the gas generating solid reacts to form gas.

17. An inflator assembly comprising:

an inflator body forming a chamber wherein a quantity of a gas generating solid reacts to form gas, a quantity of gas treatment material to treat the formed gas to form a treated gas and at least one assembly exit opening to permit the treated gas to exit the inflator assembly, wherein the gas generating solid has a flame temperature of no more than 1670 K and comprises:

at least one of an organic fuel, a transition metal salt of said organic fuel and a transition metal nitrate complex of said organic fuel, wherein said organic fuel comprises at least the elements carbon, hydrogen and oxygen, includes at least one functional group selected from the list of amide, imine, hydroxyl and carboxylic acids and has an oxygen-to-carbon mole ratio of at least 0.5 and an exothermic heat of formation of no less than −400 KJ/mole; the at least one organic fuel, transition metal salt of said organic fuel and transition metal nitrate complex of said organic fuel present in a relative amount of between about 5 and about 50 composition weight percent;

between about 10 and about 30 composition weight percent co-fuel;

between about 25 and about 70 composition weight percent of basic metal nitrate oxidizer, and between 0 and about 15 composition weight percent metal oxide coolant, wherein the organic fuel is an amide selected from the group consisting of: barbituric acid, cyanuric acid, oxamide, biuret, hydantoin, allantoin, malonamide, succinamide, parabanic acid, diglycine, and imidurea.

18. The inflator assembly of claim 17 wherein the at least one of an organic fuel, a transition metal salt of said organic fuel and a transition metal nitrate complex of said organic fuel is present in a relative amount of between about 10 and about 20 composition weight percent.

19. The inflator assembly of claim 17 wherein the gas generating solid contains between about 15 and about 20 weight percent guanidine nitrate.

20. The inflator assembly of claim 17 wherein the gas generating solid contains basic copper nitrate.

21. The inflator assembly of claim 17 wherein the basic metal nitrate oxidizer is basic copper nitrate and said basic copper nitrate is present in a relative amount of between about 30 and about 65 composition weight percent.

22. The inflator assembly of claim 17 wherein the gas generating solid comprises at least one metal oxide selected from the group consisting of cupric oxide, iron oxide and zinc oxide.

23. The inflator assembly of claim 17 wherein at least a portion of the quantity of gas treatment material is disposed within the chamber wherein a quantity of the gas generating solid reacts to form gas.

24. An inflator assembly of reduced size and weight for inflating an inflatable vehicle occupant safety restraint, the inflator assembly comprising:

an inflator body forming a chamber wherein a quantity of the gas generating solid reacts to form gas, a quantity of gas treatment material to treat the formed gas to form a treated gas and at least one assembly exit opening to permit the treated gas to exit the inflator assembly and pass to an associated inflatable vehicle occupant safety restraint, wherein the gas generating solid has a flame temperature of no more than 1670 K and comprises:

at least one of an organic fuel, a transition metal salt of said organic fuel and a transition metal nitrate complex of said organic fuel, wherein said organic fuel comprises at least the elements carbon, hydrogen, oxygen and nitrogen, includes at least one amide functional group and has an oxygen-to-carbon mole ratio of at least 0.5 and an exothermic heat of formation of no less than −400 KJ/mole; the at least one organic fuel, transition metal salt of said organic fuel and transition metal nitrate complex of said organic fuel present in a relative amount of between about 5 and about 50 composition weight percent;

between about 10 and about 30 composition weight percent guanidine nitrate;

between about 25 and about 70 composition weight percent of basic copper nitrate oxidizer, and between 0 and about 15 composition weight percent metal oxide coolant selected from the group consisting of cupric oxide, iron oxide and zinc oxide, wherein the organic fuel is an amide selected from the group consisting of barbituric acid, cyanuric acid, oxamide, biuret, hydantoin, allantoin, malonamide, succinamide, parabanic acid, diglycine, and imidurea.

25. The inflator assembly of claim 24 wherein:

the at least one organic fuel, transition metal salt of said organic fuel and transition metal nitrate complex of said organic fuel is present in a relative amount of between about 10 and about 20 composition weight percent;

the guanidine nitrate is present in a relative amount of between about 15 and about 20 composition weight percent guanidine nitrate; and the basic copper nitrate oxidizer is present in a relative amount of between about 30 and about 65 composition weight percent.

26. The inflator assembly of claim 24 wherein at least a portion of the quantity of gas treatment material is disposed within the chamber wherein a quantity of the gas generating solid reacts to form gas.

* * * * *